United States Patent
Kunz et al.

(10) Patent No.: US 7,363,257 B2
(45) Date of Patent: Apr. 22, 2008

(54) METHOD AND SYSTEM FOR IN-LINE SECONDARY TRANSACTIONS

(75) Inventors: Michael C Kunz, Seattle, WA (US); Austina M. De Bonte, Woodinville, WA (US); Aly Valli, Seattle, WA (US); Daniel J. Makoski, Redmond, WA (US); Daniel J. Welsh, Seattle, WA (US); Dennis H Harding, Bothell, WA (US); Oliver Roup, Seattle, WA (US); Jerry P Hook, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/096,228

(22) Filed: Mar. 31, 2005

(65) Prior Publication Data

US 2006/0224469 A1    Oct. 5, 2006

(51) Int. Cl.
*G06F 30/00* (2006.01)
(52) U.S. Cl. .................................................. 705/26
(58) Field of Classification Search .............. 705/26, 705/27
See application file for complete search history.

(56) References Cited

U.S. PATENT DOCUMENTS

| | | | | |
|---|---|---|---|---|
| 5,991,749 | A * | 11/1999 | Morrill, Jr. ................. | 705/44 |
| 6,505,171 | B1 * | 1/2003 | Cohen et al. ................. | 705/26 |
| 2001/0042020 | A1 * | 11/2001 | Schachne et al. ............. | 705/26 |
| 2002/0147658 | A1 * | 10/2002 | Kwan .......................... | 705/26 |
| 2003/0088483 | A1 * | 5/2003 | Moyer ......................... | 705/27 |
| 2003/0126036 | A1 * | 7/2003 | Mascavage et al. .......... | 705/26 |
| 2004/0210536 | A1 * | 10/2004 | Gudelj et al. ................. | 705/64 |
| 2004/0215526 | A1 * | 10/2004 | Luo et al. ..................... | 705/26 |
| 2005/0283408 | A1 * | 12/2005 | Kassan ........................ | 705/26 |
| 2007/0038519 | A1 * | 2/2007 | Johansson et al. ........... | 705/26 |

OTHER PUBLICATIONS

New Media age, Will e-money decision kill the premium SMS market?, Apr. 1, 2004, London, p. 14.*

* cited by examiner

*Primary Examiner*—Jeffrey A. Smith
*Assistant Examiner*—Jason B. Dunham

(57) ABSTRACT

In-line secondary transaction is described. In an embodiment, an on-line shopping interface is displayed via which an item can be selected for purchase. When a selection is received to initiate a purchase of the item, a determination is made that a secondary transaction is needed to complete the purchase of the item. An in-line secondary transaction user interface is displayed over a portion of the on-line shopping interface to facilitate the secondary transaction where the in-line secondary transaction user interface is displayed to maintain a context of the purchase on the on-line shopping interface. An input of transaction information is received via the in-line secondary transaction user interface to complete the secondary transaction such that the purchase of the item can be completed via the on-line shopping interface.

13 Claims, 15 Drawing Sheets

METHOD AND SYSTEM FOR IN-LINE SECONDARY TRANSACTIONS

TECHNICAL FIELD

This invention relates to on-line purchasing systems and methods.

BACKGROUND

Electronic shopping systems provide that merchants and other on-line distributors can advertise and sell goods and services to consumers that typically user computers and/or computer-based devices to shop for items and services on the Web (e.g., the World Wide Web). Shopping on the Web via the Internet is convenient for comparison-based shopping without ever having to leave one's home, and is used by many consumers as a way to save time shopping and as away to shop for products that may not be available locally. However, the traditional purchase experience of initiating a purchase via a Web site poses barriers to purchases being completed, such as when a consumer is re-directed away from the context of a purchase to facilitate a shopping cart and check out process. This loss of context with purchases leads to drop-offs and cancellations of the purchases.

Typically a checkout process to purchase an item involves the buyer adding an item to a shopping cart, and then being re-directed through a series of Web pages containing the actions and steps to complete the checkout process to purchase the item. This checkout model can seem burdensome to a buyer, and can lead to the drop-offs in completed purchases. When a buyer loses focus on an item that has been initiated for purchase, the buyer may cancel or be enticed away from the purchase. For example, when a buyer is re-directed to other Web pages to setup billing and shipping information, the context of the transaction is lost and/or the buyer may simply not be willing to go through the process to complete the purchase transaction.

SUMMARY

In-line secondary transaction is described herein.

In an implementation of in-line secondary transaction, an on-line shopping interface is displayed via which an item can be selected for purchase. When a selection is received to initiate a purchase of the item, a determination is made that a secondary transaction is needed to complete the purchase of the item. An in-line secondary transaction user interface is displayed over a portion of the on-line shopping interface to facilitate the secondary transaction where the in-line secondary transaction user interface is displayed to maintain a context of the purchase on the on-line shopping interface. An input of transaction information is received via the in-line secondary transaction user interface to complete the secondary transaction such that the purchase of the item can be completed via the on-line shopping interface.

BRIEF DESCRIPTION OF THE DRAWINGS

The same numbers are used throughout the drawings to reference like features and components.

DETAILED DESCRIPTION

In-line secondary transaction provides an improved online shopping experience for users by eliminating the need to switch back and forth between an item view where an item is selected for purchase and a shopping cart and checkout process for each transaction. In an embodiment of in-line secondary transaction, an on-line shopping interface, such as a Web site page, is displayed via which item(s) can be selected for purchase by a consumer, such as a computer user shopping for goods and services via the Web.

If a secondary transaction is needed to complete a selected purchase, then an in-line secondary transaction user interface is displayed over a small portion of the on-line shopping interface to facilitate the purchase. The secondary transaction may be needed to obtain additional information related to the selected purchase, such as billing, address, and/or shipping information, or may be needed to add additional credits to a purchase account or to set-up a purchase account for the consumer. The in-line secondary transaction user interface keeps the consumer in the context of the primary, selected purchase via the on-line shopping interface while obtaining purchase and/or transaction information via the in-line secondary transaction user interface.

While aspects of the described systems and methods for in-line secondary transaction can be implemented in any number of different computing systems, environments, and/or configurations, embodiments of in-line secondary transaction are described in the context of the following exemplary system architectures.

Figure 1:
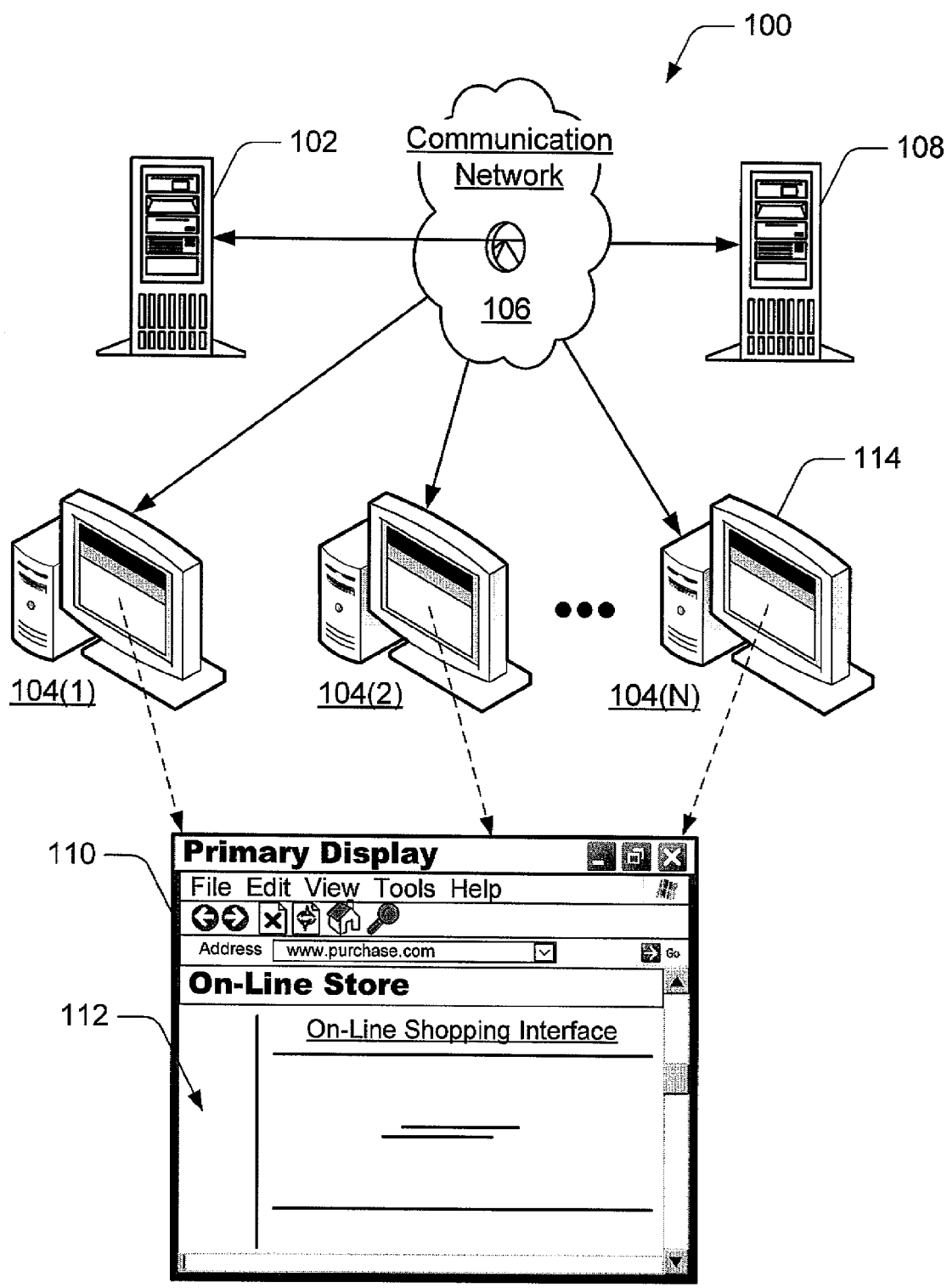
FIG. 1 illustrates an exemplary on-line purchase system in which embodiments of in-line secondary transaction can be implemented.

FIG. 1 illustrates an exemplary on-line purchase system 100 in which embodiment(s) of in-line secondary transaction can be implemented. The on-line purchase system 100 includes a server device 102 and any number of client devices 104(1-N) configured for communication with server device 102 via a communication network 106, such as the Internet. In an implementation of the on-line purchase system 100, server device 102 is an on-line store, merchant, or distributor via which a consumer, such as a computer user at a client device 104, can purchase or obtain items, goods, and/or services on-line via a Web-based electronic shopping system.

Optionally, the system 100 also includes a data server 108 that maintains account and purchase data corresponding to consumers, buyers, and/or merchants, distributors, and the on-line store (e.g., server device 102). The data server 108 is also configured for communication with the other system devices via communication network 106. Any one or more of the client devices 104(1-N) and/or server devices 102 and 108 may be implemented as any form of computing or electronic device with any number and combination of differing components as described below with reference to the computing device 1200 shown in FIG. 12 and/or with reference to the exemplary computing environment 1500 shown in FIG. 15.

In this example, a client device 104 includes a display application, such as a Web browser application for example, that provides a primary display user interface 110 to facilitate user interaction with an on-line shopping interface 112 (e.g., a Web site) that is associated with the on-line store 102 and which can be displayed on display device 114 of a client device (e.g., client device 104(N) includes a display device 114). The display user interface 110 displays the on-line shopping interface 112 via which a consumer selection to initiate a purchase of an item displayed on the shopping interface can be received. For example, a computer user at a client device 104 (e.g., a consumer or buyer) can initiate the purchase of an item displayed on the on-line shopping interface 112 by initiating a selectable control option on the shopping interface.

Although the on-line purchase system 100 is shown with only one server device 102 (e.g., an on-line store) and only one data server 108, the system 100 can include any number of on-line merchants, stores, and/or distributors, as well as any number of consumers (e.g., client devices 104) and additional data servers 108 to implement various embodiments of in-line secondary transaction.

FIGS. 2-10 illustrate an example of in-line secondary transaction which keeps a consumer or buyer (e.g., a computer user at a client device 104) in the context of a primary purchase via an on-line shopping interface while obtaining purchase and/or transaction information via an in-line secondary transaction. When a primary purchase is initiated by a consumer via an on-line shopping interface, a secondary transaction may be needed to complete the purchase. A secondary transaction may include any number of transactions that interrupt the primary purchase, such as to set up or create a purchase account, obtain billing, address, and/or shipping information, buy more points or add credits or currency to an existing account, provide logon information such as a password and/or a logon identifier, and/or any other type of secondary transaction that may be needed to complete an on-line purchase. A secondary transaction to obtain billing information may include obtaining a premium SMS (Short Message Service) billing code to enable direct billing to a mobile device of a consumer, such as a mobile phone for example. A consumer can enter a premium SMS billing code to generate a billing event that is charged to the consumer's monthly phone bill.

In-line secondary transaction provides that the consumer's focus on the primary purchase is not interrupted by the secondary transaction. As such, the purchase and/or transaction information can be obtained via an in-line secondary transaction while maintaining a context of the purchase on the on-line shopping interface. In-line secondary transaction keeps the consumer's focus on the purchase to decrease the likelihood of a purchase drop-off, and also allows for a more efficient and seamless purchase and transaction. Further, in-line secondary transaction provides a simplified purchase process that does not re-direct the consumer away from the context of a purchase to facilitate a separate shopping cart and check out process.

Once the secondary transaction is accomplished, the consumer is returned to the primary purchase at the on-line shopping interface. In-line secondary transaction is similar to the model of buying an item in a store. For example, a consumer selects an item for purchase and, while continuing to shop or proceeding to checkout, has possession of the selected item to view and have available for purchase. The focus of the store purchase is uninterrupted. In-line secondary transaction can be implemented for any such on-line or off-line transactional experience and is applicable to shopping in general for any item, product, good, and/or or service, to include software downloads, signing up for a free Web site account to access the Web site, and free subscriptions where there is no exchange of a monetary or value-based nature.

Figure 2:
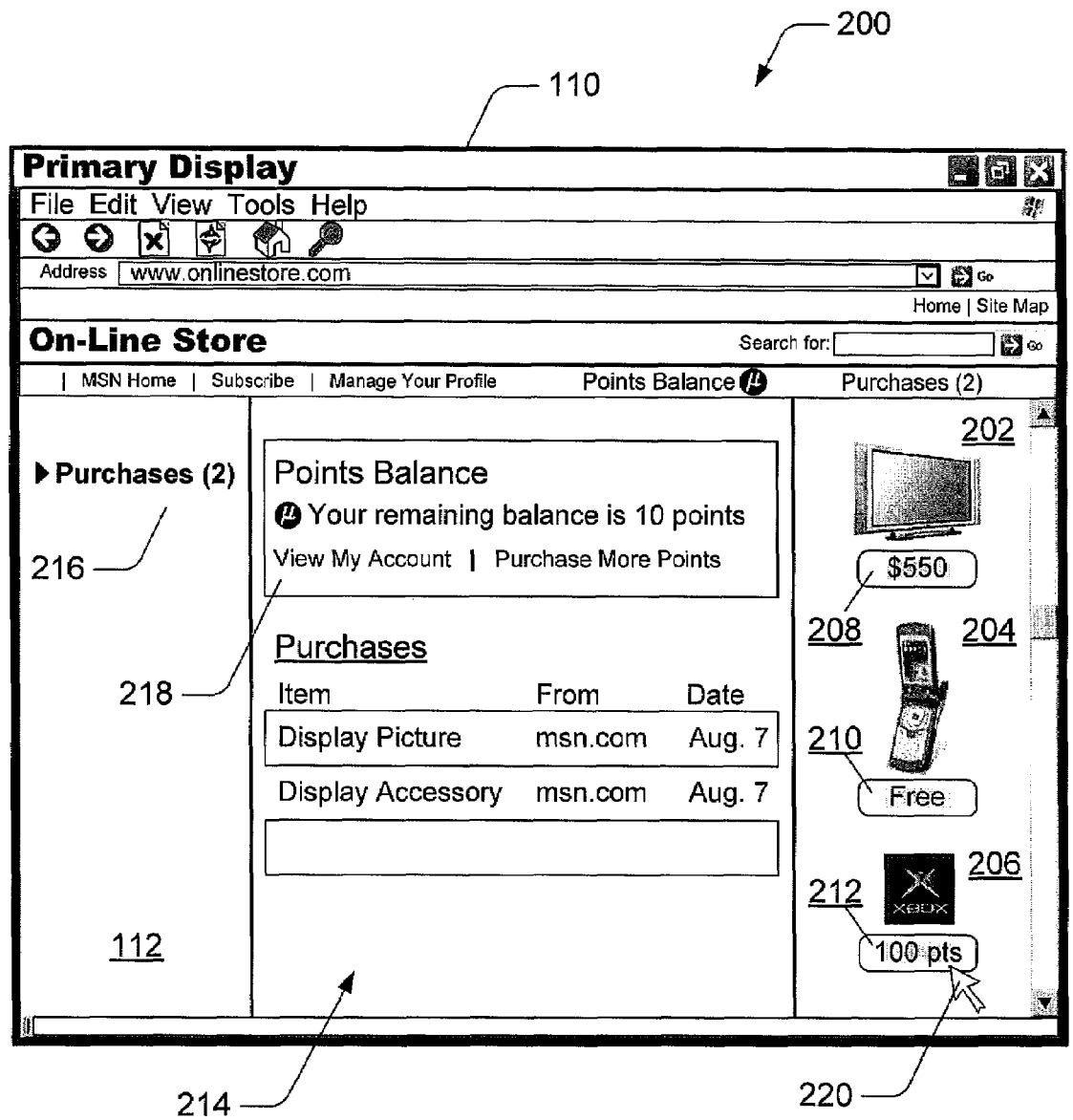
FIGS. 2-10 illustrate an example of in-line secondary transaction.

FIG. 2 illustrates an example 200 of the primary display user interface 110 through which the on-line shopping interface 112 is displayed. In this example, the on-line shopping interface 112 includes items offered for a consumer, such as a television 202, a cellular phone 204, and a gaming application 206. Each of the items offered for the consumer have an associated selectable control that designates a term or condition of obtaining the item, and via which the consumer can initiate a purchase or otherwise obtain the item.

For example, television 202 has an associated selectable control 208 that indicates a monetary transaction is required to purchase the item. Cellular phone 204 has an associated selectable control 210 that indicates the cellular phone is "free", and the gaming application 206 has an associated selectable control 212 that indicates a points transaction is required to obtain the item (e.g., download the item if for a software purchase). In-line secondary transaction can be implemented for any type of resource-based or information transaction, such as a points, credits, or currency transaction, a free transaction to obtain purchase information or logon information, and/or any other type of value-based, resource-based, or information transaction.

The on-line shopping interface 112 also includes a purchases section 214 that identifies various purchases and/or transactions that have already been completed by the consumer, a second purchases identifier 216, and includes an account status 218 corresponding to a purchase account associated with the consumer. In the example described with reference to FIGS. 2-10, the purchase and the in-line secondary transaction are described as point-based value transactions. For example, a consumer can select or initiate a purchase of the gaming application 206 by selecting the associated selectable control 212, such as with a pointing device selectable input 220.

Figure 3:
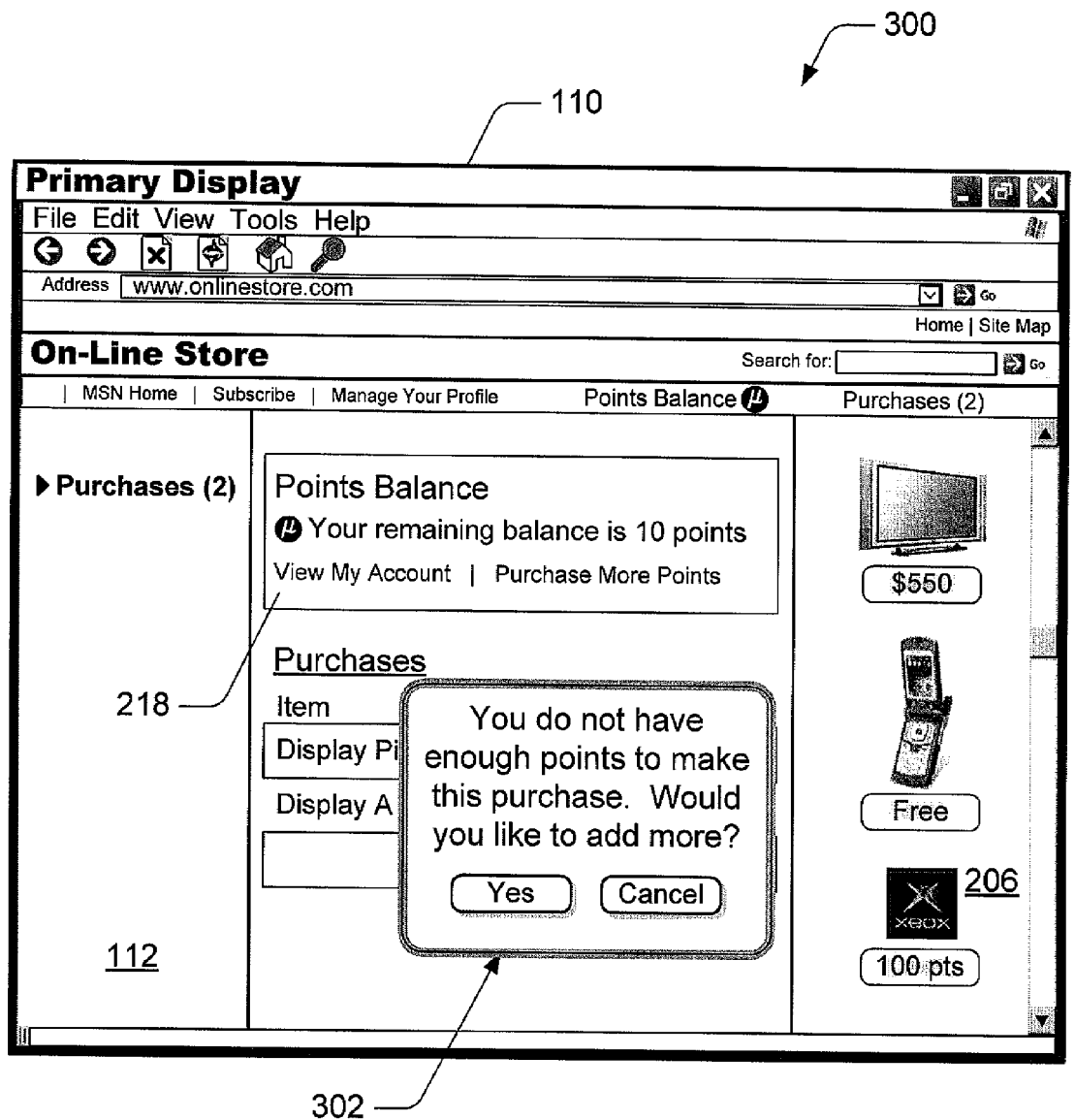

FIG. 3 illustrates an example 300 of the primary display user interface 110 through which the on-line shopping interface 112 is displayed, and over which an example of an in-line secondary transaction user interface 302 is displayed. Continuing the example from FIG. 2, the consumer initiates a purchase of the gaming application 206 by selecting the associated selectable control 212. As shown, the gaming application 206 can be obtained for a one-hundred (100) point transaction as indicated on the selectable control 212. However, the account status 218 indicates that the consumer only has a remaining balance of ten (10) points. Accordingly, an in-line secondary transaction is needed to facilitate the primary transaction or purchase (e.g., obtaining the gaming application 206).

When the purchase is initiated, a transaction application determines that the consumer or buyer does not have enough points to complete the transaction, and that an in-line secondary transaction is needed to complete the purchase of the item. Referring to FIG. 1, any of the server device 102, client devices 104(1-N), and/or data server 108 can include the transaction application to facilitate implementation of in-line secondary transaction. For example, the server device 102 (e.g., the on-line store) can include the transaction application which communicates with data server 108 to determine that the consumer does not have enough points to complete the transaction. As described above, data server 108 can maintain account and purchase data corresponding to consumers, buyers, and/or on-line stores, merchants, and distributors.

When the transaction application determines that the primary transaction (e.g., obtaining the gaming application 206) cannot be completed, the in-line secondary transaction user interface 302 is displayed over a portion of the on-line shopping interface 112 to facilitate obtaining secondary transaction information while maintaining a context of the purchase on the on-line shopping interface display 112. In this example, the in-line secondary transaction user interface 302 is displayed so as not to obscure the item 206 that has been selected for purchase by the consumer, and such that the item 206 remains viewable to the consumer. In this example, the in-line secondary transaction user interface 302 provides the consumer an option to purchase more points such that the purchase transaction can be completed. The consumer can initiate the purchase of more points via a selectable control labeled "Yes" on the user interface 302.

Figure 4:
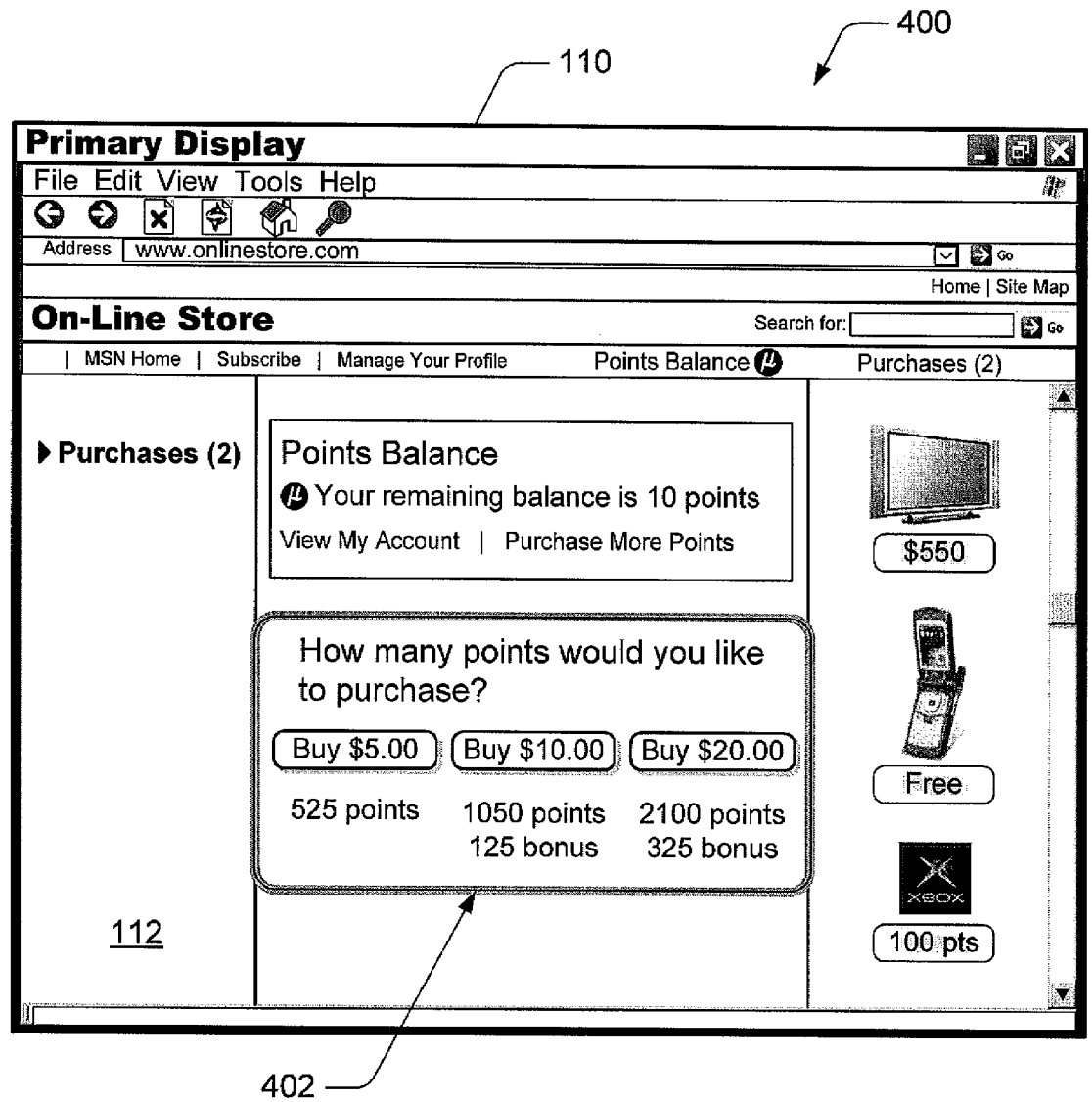

FIG. 4 illustrates an example 400 of the primary display user interface 110 through which the on-line shopping interface 112 is displayed, and over which an in-line secondary transaction user interface 402 is displayed to continue the example from FIG. 3. When the consumer selects the option to purchase more points via user interface 302, in-line secondary transaction user interface 402 is displayed to provide options for purchasing the additional points. The consumer can continue with purchasing the additional points via one of the three selectable controls that each indicate an amount of a monetary transaction to obtain an identified number of points. In this example, the consumer can select the "Buy $5.00" selectable control to obtain five-hundred and twenty-five (525) points. The transaction application can receive the transaction information (e.g., the consumer selection) and apply the points to the purchase account associated with the consumer.

Figure 5:
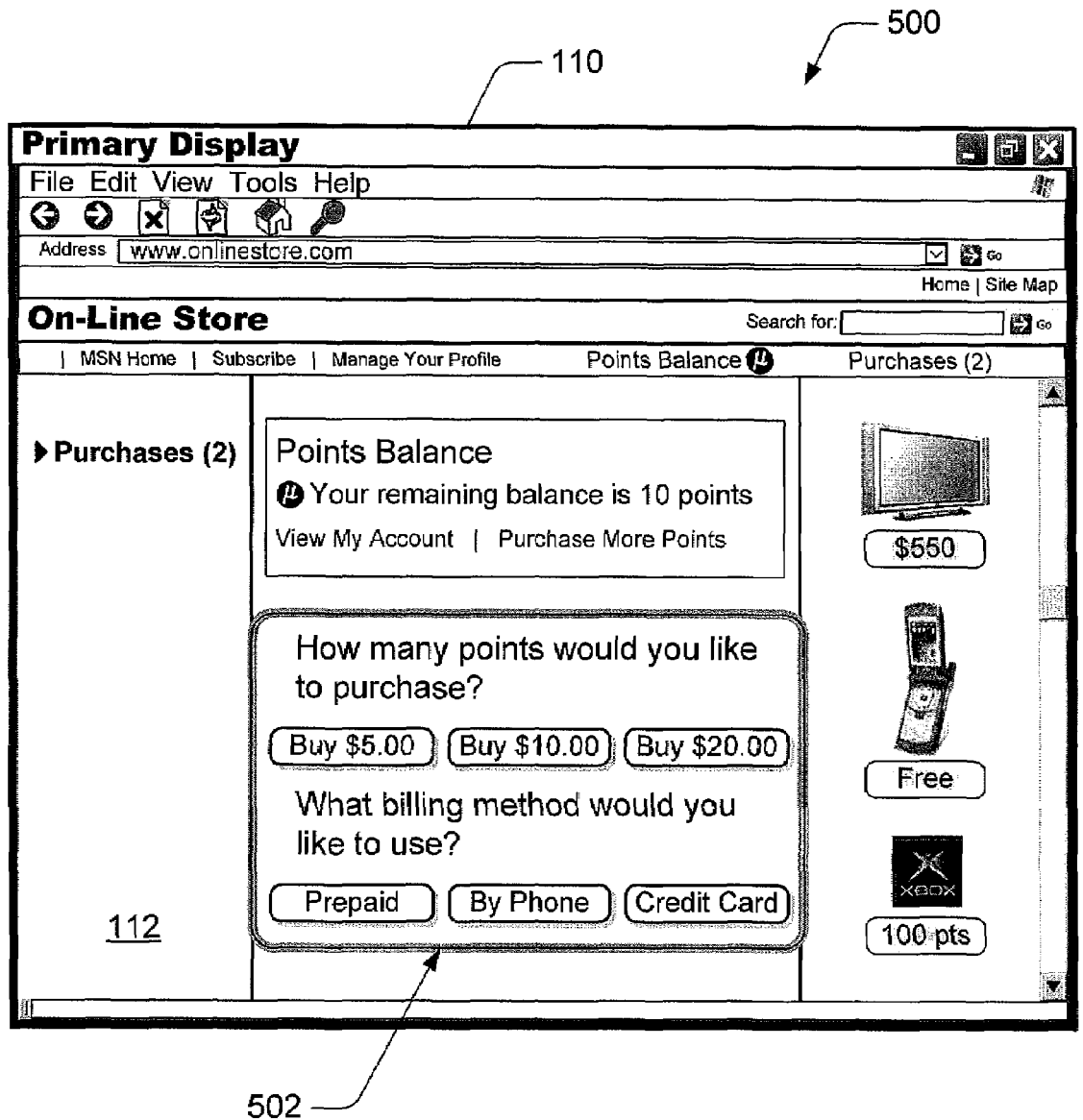

FIG. 5 illustrates an example 500 of the primary display user interface 110 through which the on-line shopping interface 112 is displayed, and over which an in-line secondary transaction user interface 502 is displayed to continue the example from FIG. 4. When the consumer selects the option to purchase an additional five-hundred and twenty-five (525) points via user interface 402, in-line secondary transaction user interface 502 is displayed to provide payment options for purchasing the additional points. The consumer can continue with purchasing the additional points via one of the three selectable controls that each indicate a payment method, such as a prepaid card, by telephone, or with a credit card. Payment by telephone can include a premium SMS (Short Message Service) billing code to enable direct billing to a mobile phone of the consumer. For example, the consumer can enter a premium SMS billing code to generate a billing event such that a purchase of the additional points is charged to the consumer's monthly phone bill.

Any number of other payment methods may be included in an alternate implementation of in-line secondary transaction. In this example, the consumer can select the "Credit Card" selectable control to initiate a credit card purchase of the additional points. The transaction information can receive the transaction information (e.g., the consumer selection) via the in-line secondary transaction user interface 502 and can then request credit card billing information.

Figure 6:
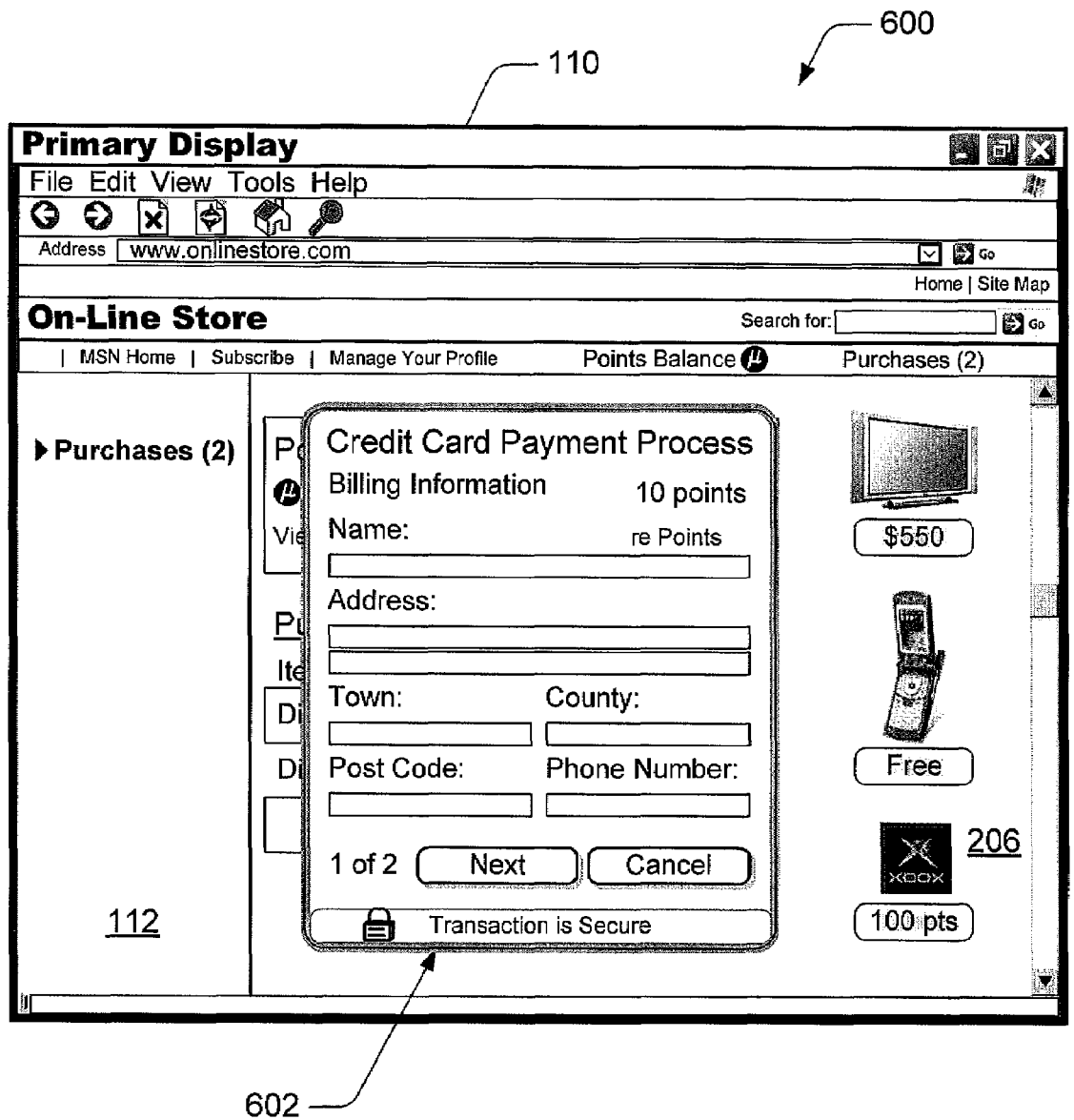

FIG. 6 illustrates an example 600 of the primary display user interface 110 through which the on-line shopping interface 112 is displayed, and over which an in-line secondary transaction user interface 602 is displayed to continue the example from FIG. 5. When the consumer selects the credit card option to purchase the additional points, the in-line secondary transaction user interface 602 is displayed to obtain secondary transaction information (e.g., credit card billing information) from the consumer. Although the example described with reference to FIGS. 6-7 pertains to obtaining billing information from a consumer, an in-line secondary transaction user interface may be implemented to obtain any other type of secondary transaction information, such as address and/or shipping information corresponding to the consumer.

Throughout this example of in-line secondary transaction, the in-line secondary transaction user interfaces are displayed so as not to obscure the item 206 that has been selected for purchase by the consumer, and such that the item 206 remains viewable to the consumer. The consumer can enter the requested credit card payment information via the in-line secondary transaction user interface 602 and then select the "Next" selectable control to continue the secondary transaction.

Figure 7:
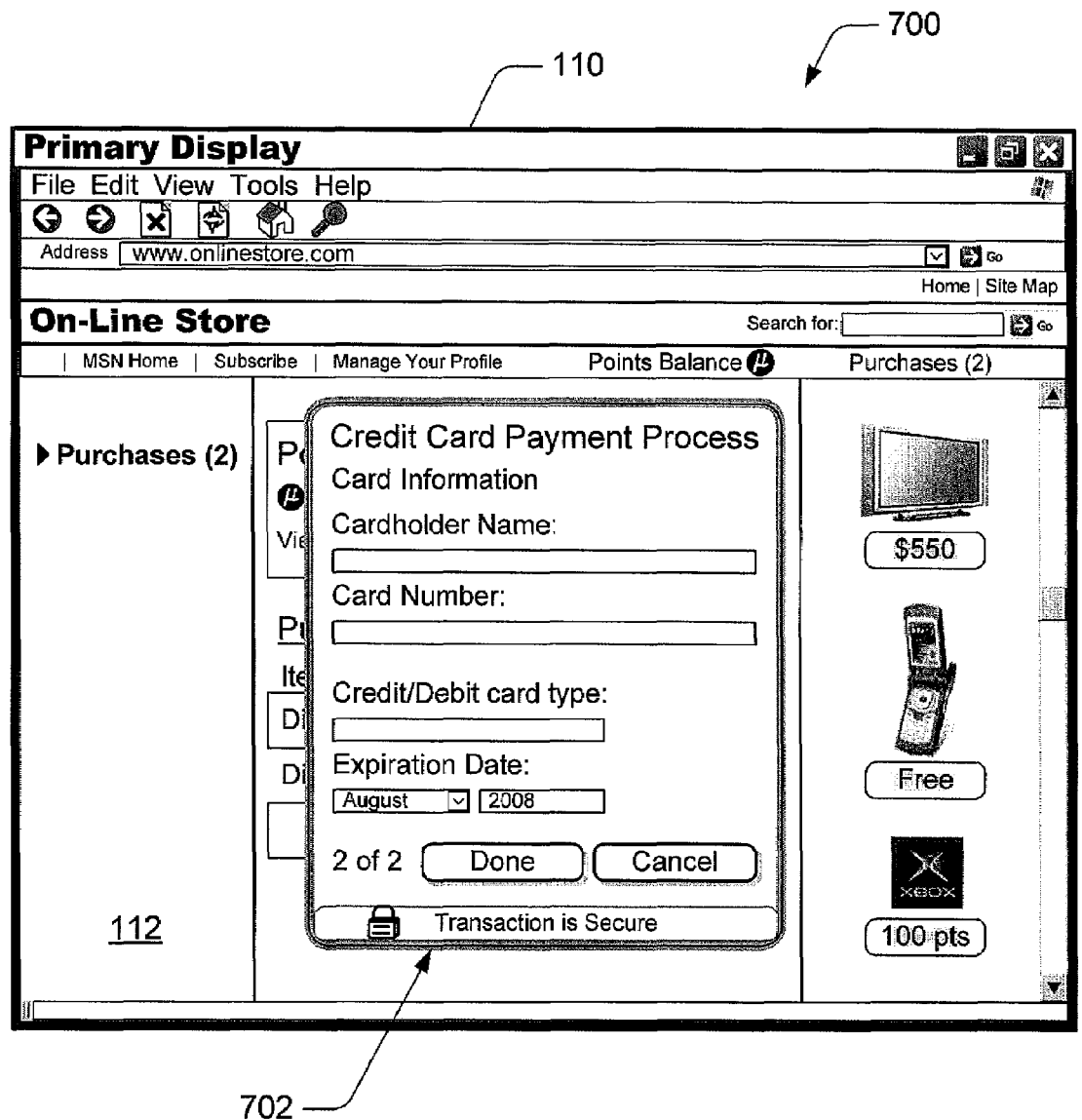

FIG. 7 illustrates an example 700 of the primary display user interface 110 through which the on-line shopping interface 112 is displayed, and over which an in-line secondary transaction user interface 702 is displayed to continue the example from FIG. 6. When the consumer selects the option to continue entering the credit card information (e.g., the "Next" selectable control) on user interface 602, the in-line secondary transaction user interface 702 is displayed to continue the secondary transaction. The consumer can finish entering the requested credit card payment information via the in-line secondary transaction user interface 702 and then select the "Done" selectable control to complete the in-line secondary transaction.

Figure 8:
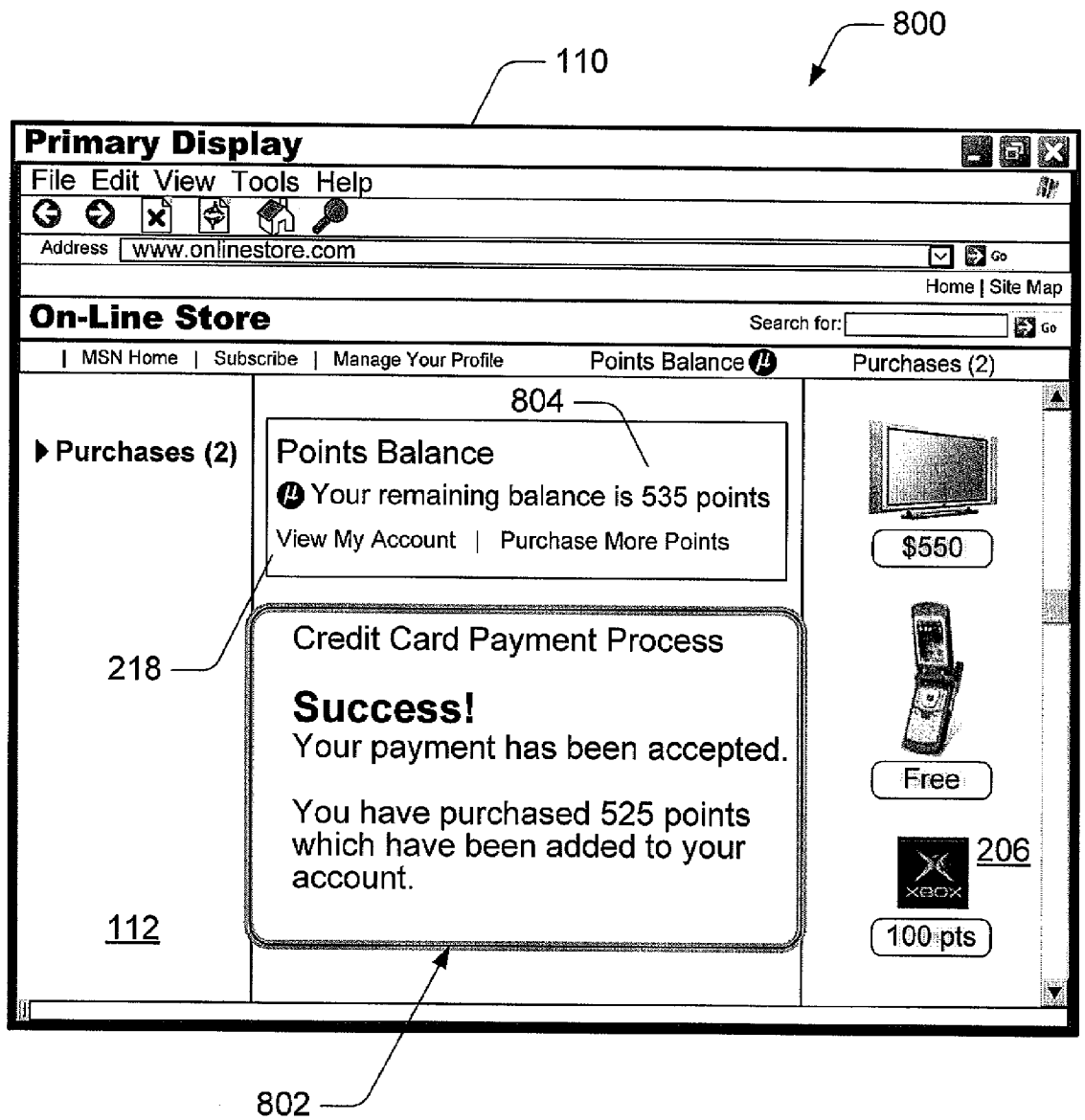

FIG. 8 illustrates an example 800 of the primary display user interface 110 through which the on-line shopping interface 112 is displayed, and over which in-line secondary transaction user information 802 is displayed to continue the example from FIG. 7. When the consumer selects the option to complete the in-line secondary transaction on user interface 702, the in-line secondary transaction user information 802 is displayed to convey transaction information to the consumer. In this example, the transaction information is an indication that a credit card payment has been processed successfully. In addition, the transaction application initiates that account status 218 is updated when the transaction information is received (e.g., the credit card billing information). Here, the account status 218 is updated at 804 to indicate that the consumer now has a remaining balance of five-hundred and thirty-five (535) points, up from the original ten (10) points shown in FIG. 2.

Figure 9:
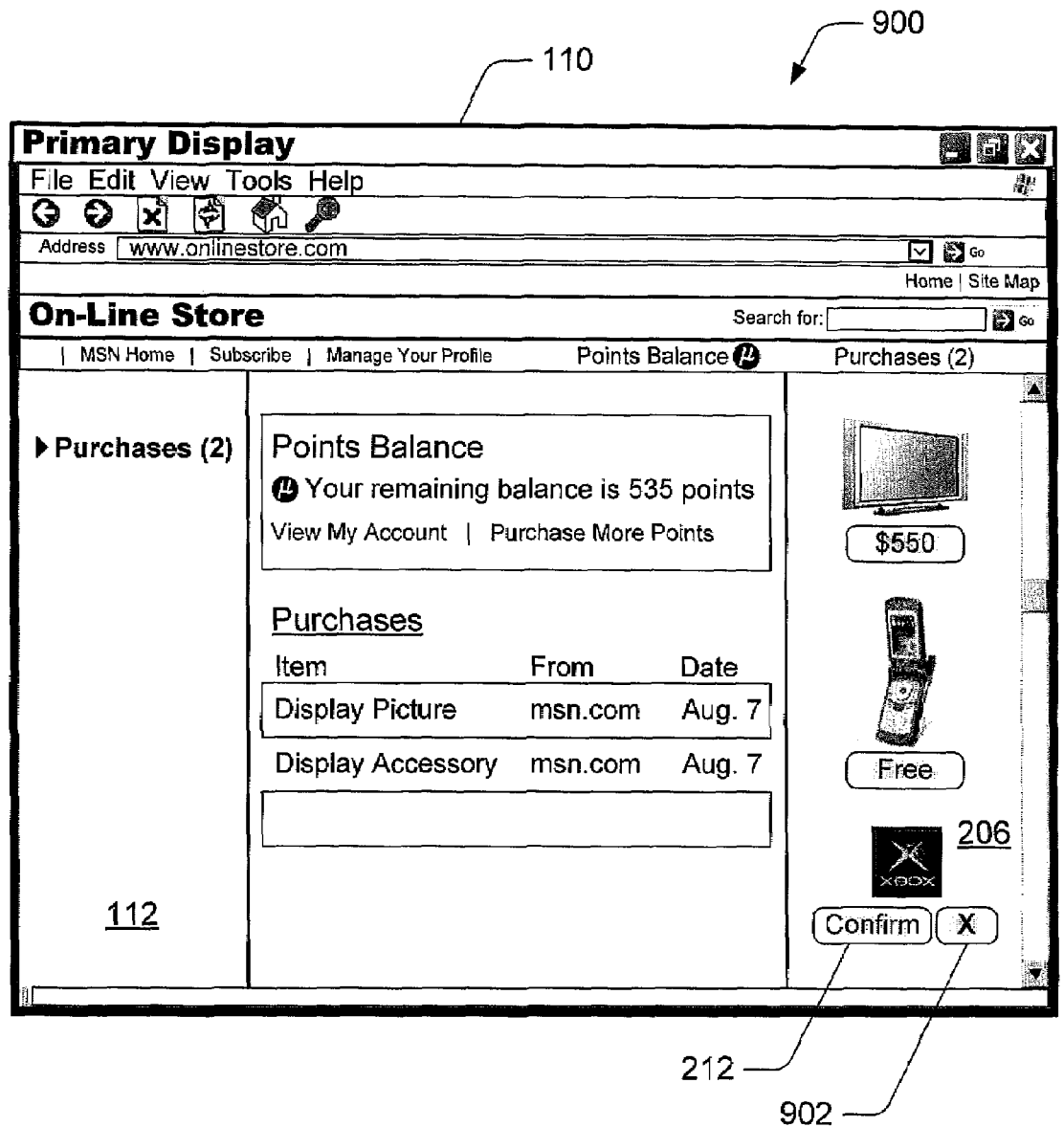

FIG. 9 illustrates an example 900 of the primary display user interface 110 through which the on-line shopping interface 112 is displayed to continue the example from FIG. 8. When the consumer is notified that the credit card payment has been processed successfully via the in-line secondary transaction user information 802, a focus of the purchase is returned to the on-line shopping interface 112 to complete the purchase of the gaming application 206. In this example, the selectable control 212 that is associated with item 206 conveys an indication to the consumer to "Confirm" the purchase, or alternatively, the consumer can cancel the purchase by selecting a control "X" 902 that is displayed on the on-line shopping interface 112 and associated with item 206.

Figure 10:
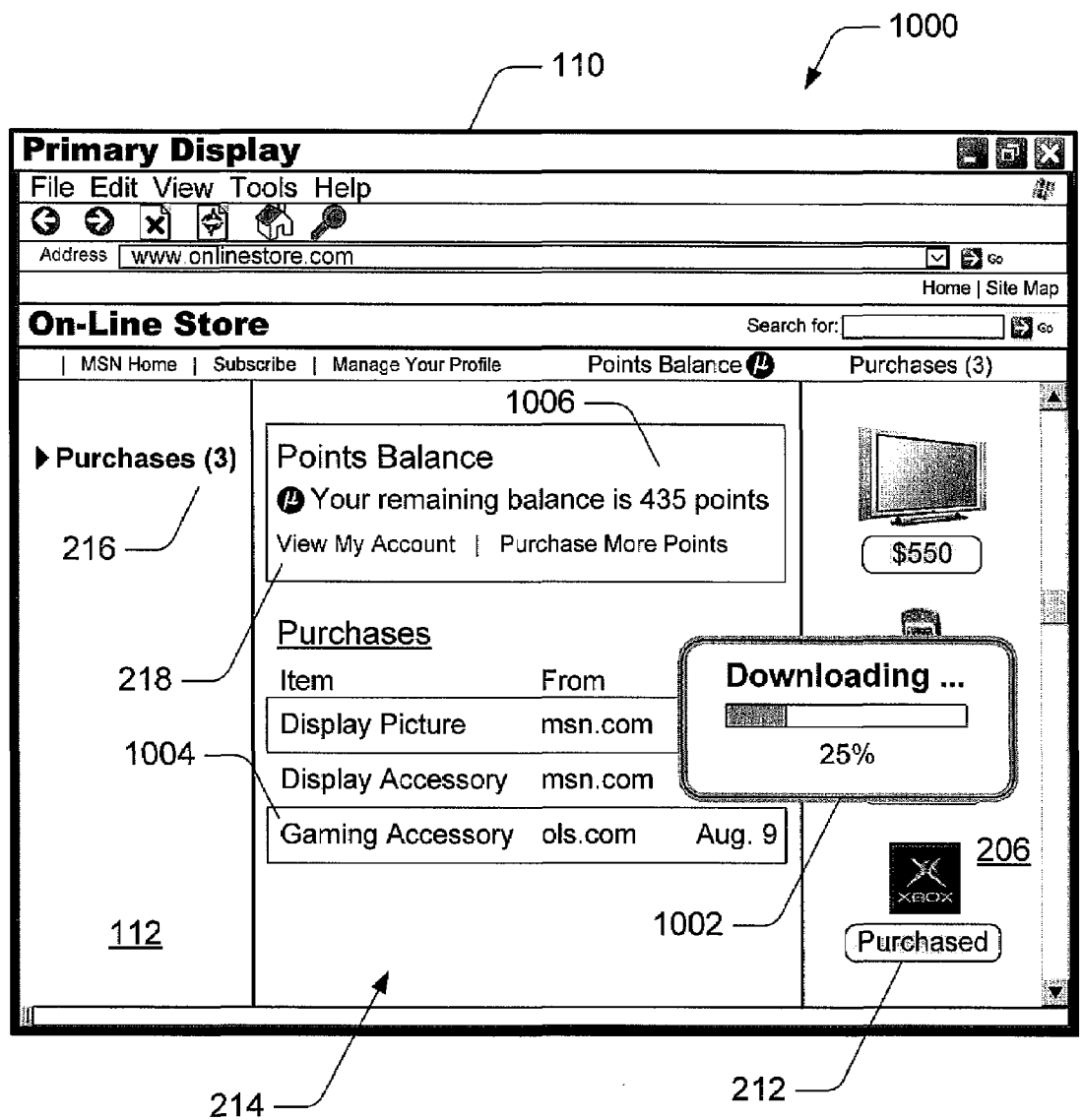

FIG. 10 illustrates an example 1000 of the primary display user interface 110 through which the on-line shopping interface 112 is displayed to continue the example from FIG. 9. When the consumer selects the "Confirm" selectable control 212 on the on-line shopping interface 112, in-line secondary transaction user interface 1002 is displayed over the on-line shopping interface 112 to provide feedback for the consumer. In this example, the consumer is notified that the purchased gaming application 206 is downloading to the consumer's client device 104 via the communication network 106 (FIG. 1).

The transaction application can also initiate various updates to the on-line shopping interface 112 that coincide with the purchase of the gaming application 206. For example, the selectable control 212 that is associated with item 206 conveys an indication to the consumer that the item has been "Purchased". Additionally, the purchases section 214 of the on-line shopping interface 112 is updated at 1004 to indicate that the item 206 (e.g., a "Gaming Accessory") has been purchased, and the second purchases identifier 216 is updated to reflect the recent purchase. In addition, the account status 218 is updated at 1006 to indicate that the consumer now has a remaining balance of four-hundred and thirty-five (435) points, down one-hundred (100) points as shown in FIG. 8 (i.e., the item 206 was obtained for a one-hundred (100) point transaction as indicated on the selectable control 212 in FIG. 2).

Figure 11:
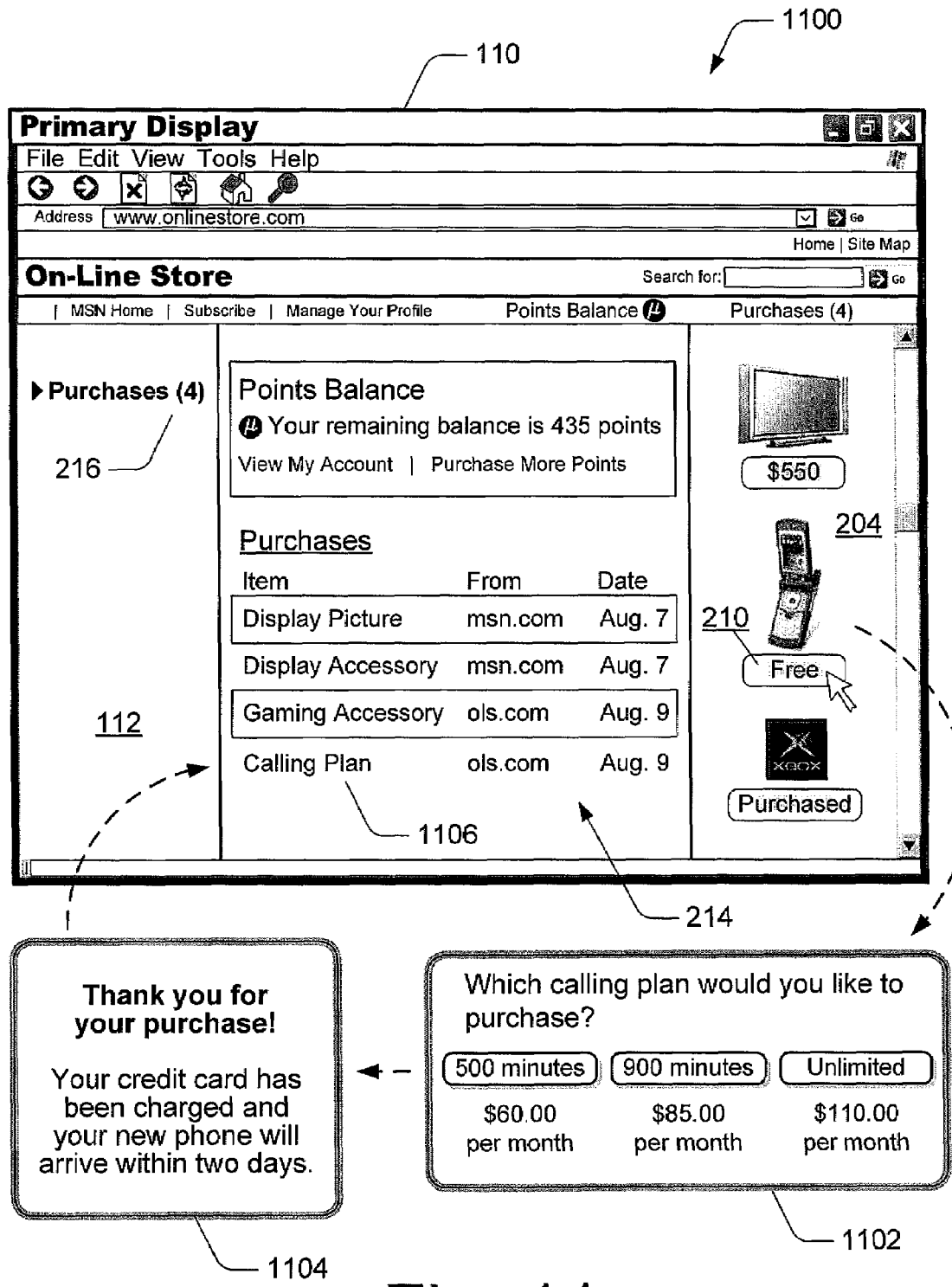
FIG. 11 illustrates another example of in-line secondary transaction.

FIG. 11 illustrates another example 1100 of an in-line secondary transaction. The on-line shopping interface 112 is displayed through the primary display user interface 110. When a consumer initiates obtaining the cellular phone 204 by selecting the associated selectable control 210, such as with a pointing device selectable input, an in-line secondary transaction user interface 1102 is displayed to obtain additional information needed to complete the primary transaction. In this example, the cellular phone 204 is free but the consumer needs to select and pay for a calling plan to get the free phone (e.g., complete a secondary transaction before the primary transaction can be completed). As such, the in-line secondary transaction user interface 1102 provides options for selecting a calling plan via which the consumer can use the cellular phone 204. Alternatively, or in addition, another in-line secondary transaction user interface may be displayed such that the consumer can enter address and/or shipping information to receive the cellular phone 204.

When the consumer selects a calling plan option via the in-line secondary transaction user interface 1102, another in-line secondary transaction user interface 1104 is displayed to convey transaction information to the consumer. In this example, the transaction information is an indication that a credit card has been successfully charged and that the consumer will shortly receive the free cellular phone 204. This example assumes that the consumer has an established purchase account with the on-line store, and that the calling plan is automatically charged to the consumer's credit card that is associated with the established purchase account.

Although the in-line secondary transaction user interfaces 1102 and 1104 are not shown displayed "over" the on-line shopping interface 112 for discussion purposes, in practice the in-line secondary transaction user interfaces 1102 and 1104 are displayed over the on-line shopping interface 112 so as not to obscure the item 204 that has been selected by the consumer, and such that item 204 remains viewable to the consumer (such as shown in FIGS. 4 and 8).

In addition to the in-line secondary transaction user interface 1104, the transaction application can also initiate various updates to the on-line shopping interface 112 that coincide with the completed transaction to obtain the cellular phone 204. For example, the purchases section 214 of the on-line shopping interface 112 is updated at 1106 to indicate that an item associated with the cellular phone 204 (e.g., a "Calling Plan") has been purchased, and the second purchases identifier 216 is updated to reflect the recent purchase.

Figure 12:
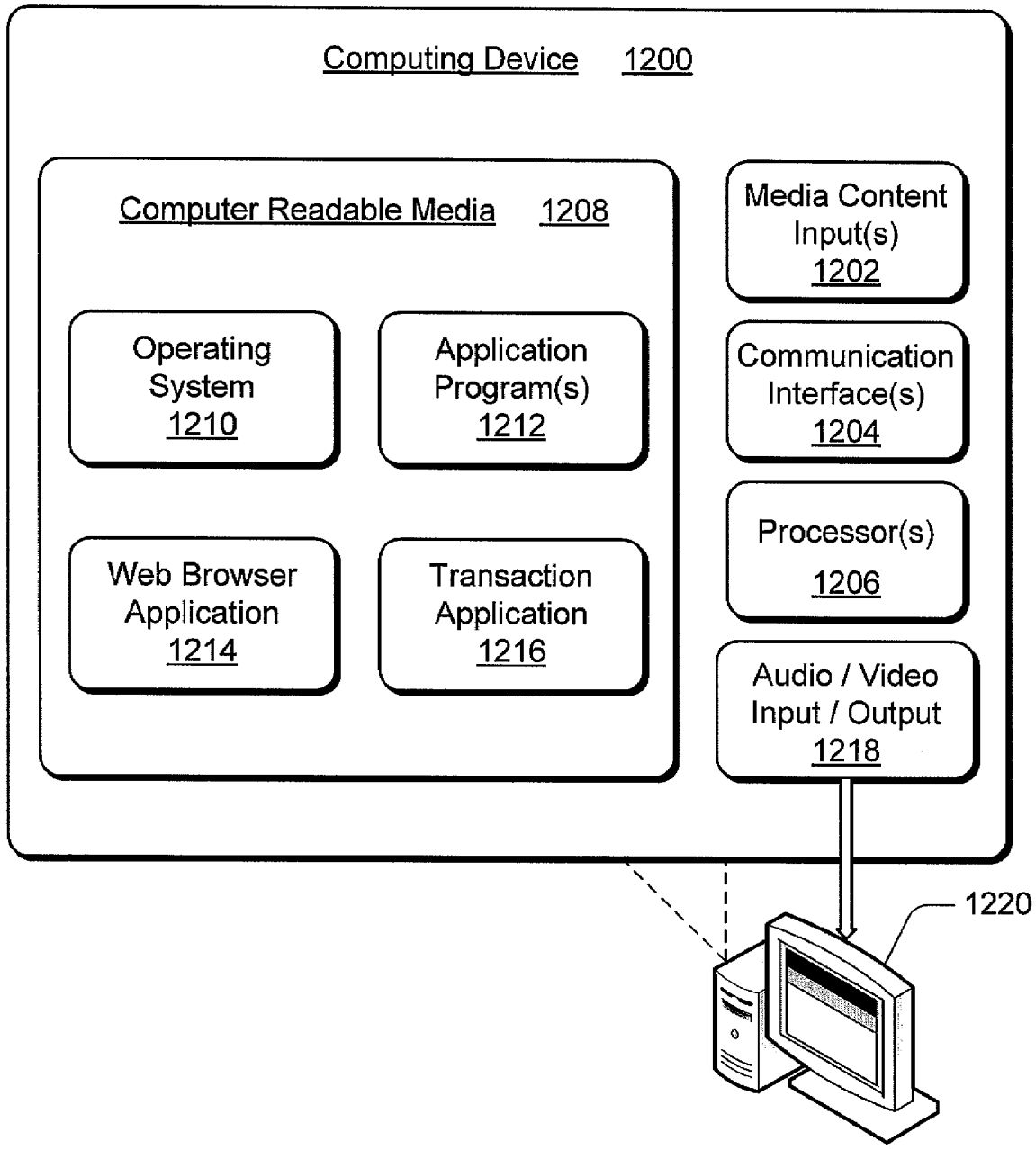
FIG. 12 illustrates select components of an exemplary computing device in which embodiments of in-line secondary transaction can be implemented.

FIG. 12 illustrates various components of an exemplary computing device 1200 in which embodiments of in-line secondary transaction can be implemented. Further, the computing device 1200 can be implemented as any one or more of the client devices 104(1-N) and as the server devices 102 and 108 described with reference to FIG. 1. The computing device 1200 can also be implemented as any form of computing or electronic device with any number and combination of differing components as described below with reference to the exemplary computing environment 1500 shown in FIG. 15.

Computing device 1200 includes one or more media content inputs 1202 which may include Internet Protocol (IP) inputs over which streams of media content are received via an IP-based network. Computing device 1200 further includes communication interface(s) 1204 which can be implemented as any one or more of a serial and/or parallel interface, a wireless interface, any type of network interface, a modem, and as any other type of communication interface. A wireless interface enables device 1200 to receive control input commands and other information from an input device, such as from a remote control device, PDA (personal digital assistant), cellular phone, or from another infrared (IR), 802.11, Bluetooth, or similar RF input device.

A network interface provides a connection between the computing device 1200 and a communication network (e.g., communication network 106 shown in FIG. 1) by which other electronic and computing devices can communicate data with device 1200. Similarly, a serial and/or parallel interface provides for data communication directly between device 1200 and the other electronic or computing devices. A modem facilitates device 1200 communications with other electronic and computing devices via a conventional telephone line, a DSL connection, cable, and/or other type of connection.

Computing device 1200 also includes one or more processors 1206 (e.g., any of microprocessors, controllers, and the like) which process various computer executable instructions to control the operation of device 1200, to communicate with other electronic and computing devices, and to implement embodiments of television system targeted advertising. Device 1200 can be implemented with computer readable media 1208, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 1208 provides data storage mechanisms to store various information and/or data such as software applications and any other types of information and data related to operational aspects of the computing device 1200. For example, an operating system 1210 and/or other application programs 1212 can be maintained as software applications with the computer readable media 1208 and executed on processor(s) 1206 to implement embodiments of in-line secondary transaction. For example, the computer readable media 1208 maintains a Web browser application 1214 and a transaction application 1216 to implement embodiments of in-line secondary transaction. Although the transaction application 1216 is illustrated and described as a single application configured to implement embodiments of in-line secondary transaction, the transaction application 1216 can be implemented as several component applications distributed to each perform one or more functions in a computing device in an on-line purchase system.

The computing device 1200 also includes an audio and/or video output 1218 that provides audio and video to an audio rendering and/or display system 1220, or to other devices that process, display, and/or otherwise render audio, video, and display data. Video signals and audio signals can be communicated from device 1200 to a display device 1220 via an RF (radio frequency) link, S-video link, composite video link, component video link, analog audio connection, or other similar communication link.

Methods for in-line secondary transaction, such as exemplary methods 1300 and 1400 described with reference to respective FIGS. 13 and 14, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 13:
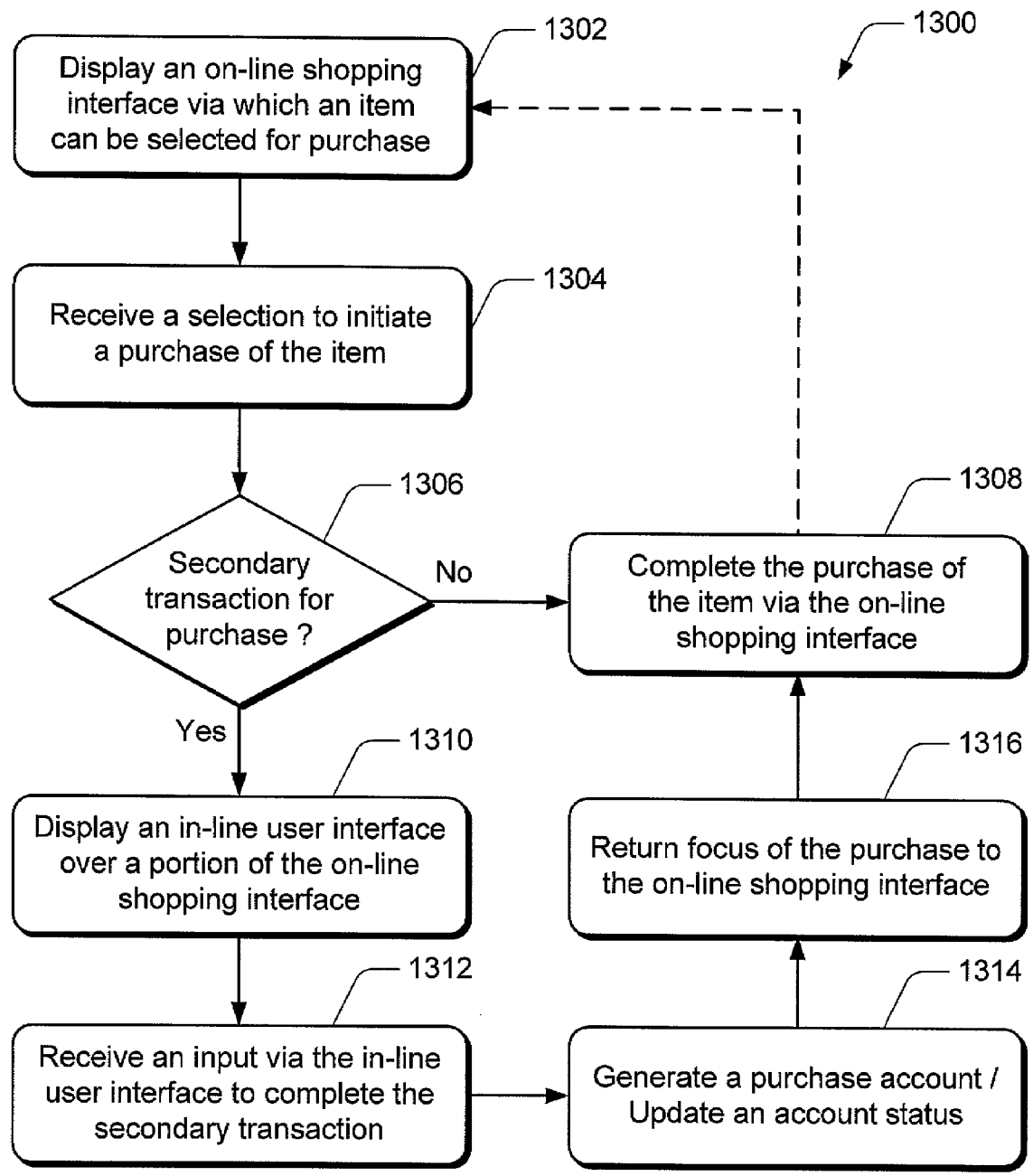
FIG. 13 is a flow diagram that illustrates an exemplary method for in-line secondary transaction.

FIG. 13 illustrates an exemplary method 1300 for in-line secondary transaction. The order in which the method is described is not intended to be construed as a limitation, and any number of the described method blocks can be combined in any order to implement the method. Furthermore, the method can be implemented in any suitable hardware, software, firmware, or combination thereof.

At block 1302, an on-line shopping interface is displayed via which an item can be selected for purchase. For example, the on-line shopping interface 112 (FIG. 2) includes items offered for consumer purchase (or acquisition). At block 1304, a selection is received to initiate a purchase of the item. For example, a consumer (e.g., a computer user at a client device 104) can initiate a purchase of an item 206 by selecting the associated selectable control 212 displayed on the on-line shopping interface 112.

At block 1306, a determination is made as to whether a secondary transaction is needed to complete the purchase of the item. If a secondary transaction is not needed to complete the purchase (i.e., no from block 1306), then the purchase of the item is completed via the on-line shopping interface at block 1308. However, if a secondary transaction is needed to complete the purchase of the item (i.e., yes from block 1306), then an in-line user interface is displayed over a portion of the on-line shopping interface at block 1310.

For example, in-line secondary transaction user interfaces 302, 402, 502, 602, 702, and 802 are displayed over a portion of the on-line shopping interface 112 to facilitate the in-line secondary transaction (as described with reference to the example shown in FIGS. 2-10). The in-line user interfaces are displayed to maintain a context of the purchase on the on-line shopping interface 112. For example, item 206 which is displayed on the on-line shopping interface 112, and which is selected for purchase in the example, is viewable during the in-line secondary transaction(s) as shown in FIGS. 2-10.

At block 1312, an input is received via the in-line user interface to complete the secondary transaction. Receiving the input, such as from a consumer or buyer, can include adding credits to a purchase account via the in-line user interface such that the purchase of the item can be completed with the credits, where the credits can include any one or combination of points, currency, or prepaid credits. Receiving the input can also include receiving secondary transaction information associated with the consumer or buyer to complete the purchase of the item, such as billing information, address and/or shipping information, a premium SMS billing code, and the like that may be associated with the consumer or buyer and which is needed to complete the purchase of the item.

At block 1314, a purchase account is generated and/or updated based on the input to the in-line user interface. For example, an account status 218 (FIG. 2) associated with a consumer or buyer and displayed on the on-line shopping interface 112 can be updated when receiving an input via the in-line secondary transaction user interfaces described with reference to the examples shown in FIGS. 2-10. At block 1316, a focus of the purchase is returned to the on-line shopping interface when the secondary transaction is completed, and the purchase of the item is completed via the on-line shopping interface at block 1308. Optionally, the method 1300 then continues at block 1302 to again display an on-line shopping interface via which items can be selected for purchase.

Figure 14:
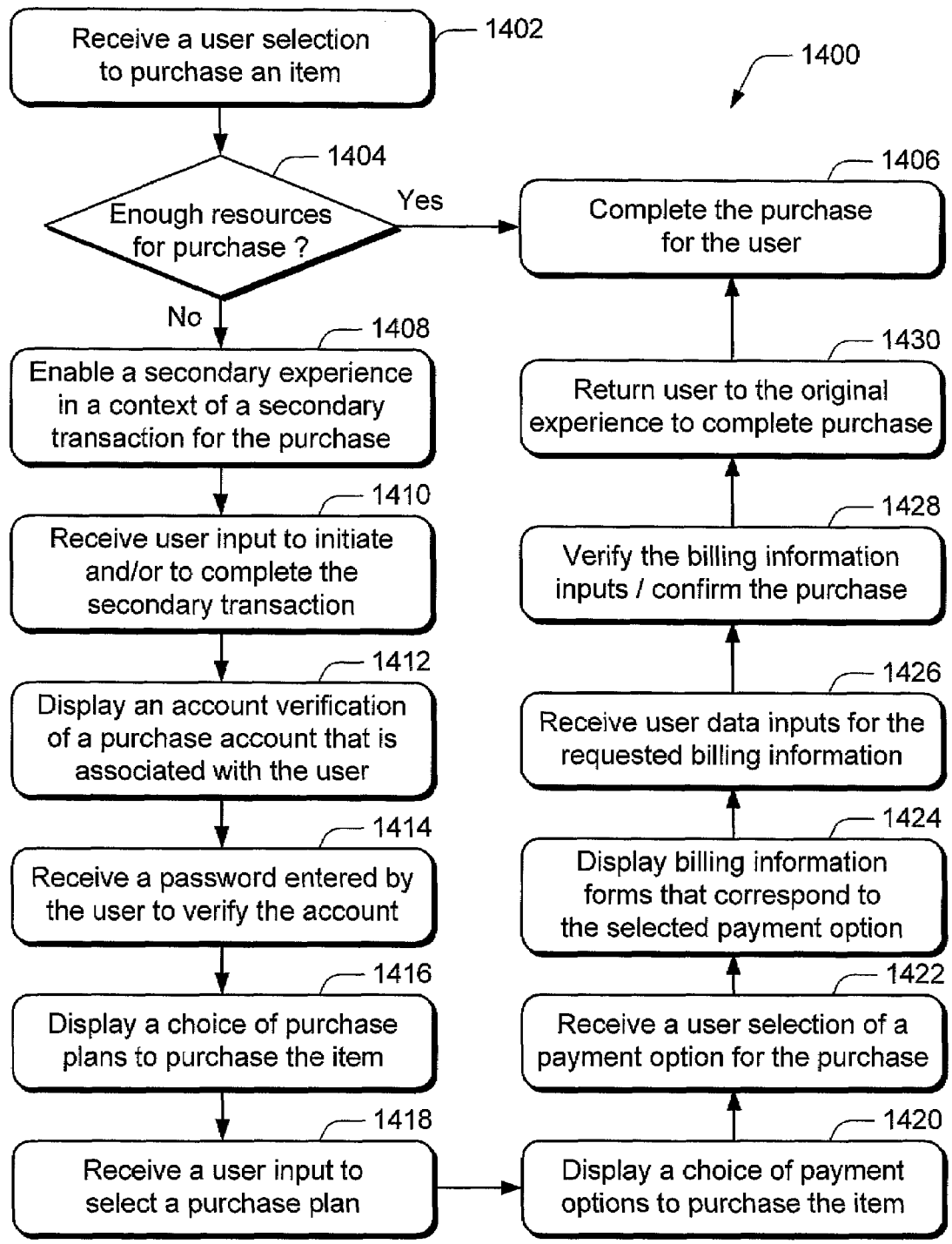
FIG. 14 is a flow diagram that illustrates an exemplary method for in-line secondary transaction.

FIG. 14 illustrates another exemplary method 1400 for in-line secondary transaction. The order in which the method is described is not intended to be construed as a limitation, and any number of the described method blocks can be combined in any order to implement the method. Furthermore, the method can be implemented in any suitable hardware, software, firmware, or combination thereof.

At block 1402, a user selection to purchase an item is received. For example, a computer user at a client device 104 (FIG. 1) can select an item to purchase via the on-line shopping interface 112 (FIG. 2). At block 1404, a determination is made as to whether the user has enough resources to complete the purchase. For example, the server device 102 (e.g., the on-line store that is associated with the on-line shopping interface 112) can request purchase account data corresponding to the user from server device 108 to determine whether the user has enough resources to complete the purchase of the item.

If the user does have enough resources to complete the purchase (i.e., yes from block 1404), then the purchase is completed for the user at block 1406. If the user does not have enough resources to complete the purchase (i.e., no from block 1404), then a secondary experience opens in a context of a secondary transaction to complete the purchase (e.g., the initial transaction) at block 1408. For example, the in-line secondary transaction user interfaces 1102 and 1104 (FIG. 11) are a secondary experience that opens in context to complete the primary purchase.

At block 1410, a user input is received to initiate and/or to complete the secondary transaction. At block 1412, an account verification of a purchase account that is associated with the user is displayed and, at block 1414, a password that is entered by the user to verify the account is received. At block 1416, a choice of purchase plans are displayed to purchase the item and, at block 1418, a user input is received to select a purchase plan.

At block 1420, a choice of payment options to purchase the item is displayed and, at block 1422, a user selection of a payment option is received. At block 1424, billing information forms are displayed which are appropriate to the payment instrument (e.g., forms that correspond to the selected payment option are displayed) and, at block 1426, user data inputs for the requested billing information are received. At block 1428, the billing information inputs are verified and the purchase is confirmed. At block 1430, the secondary purchase experience is closed and the user is returned to the original purchase experience to complete the original purchase at block 1406.

Figure 15:
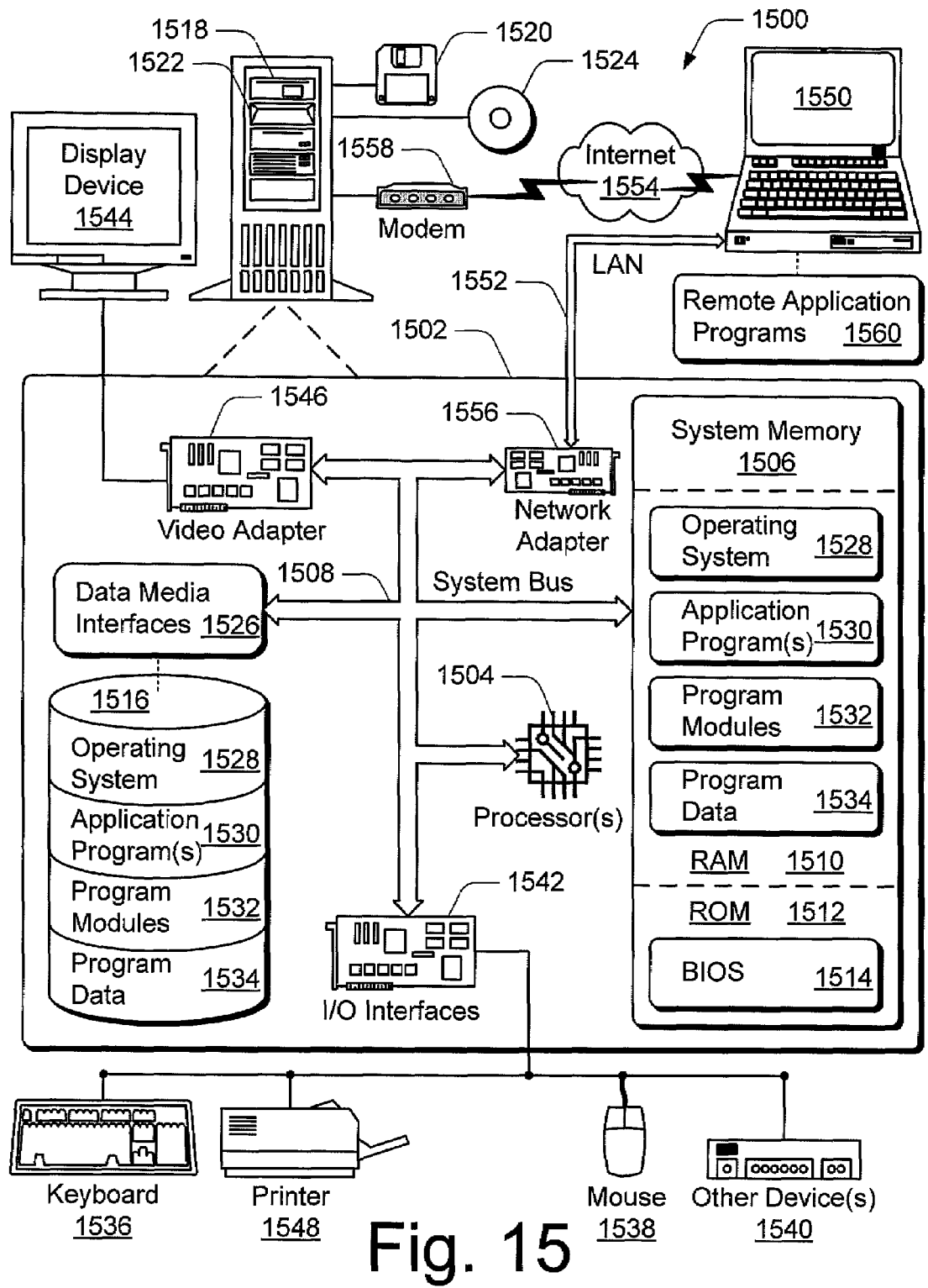
FIG. 15 illustrates exemplary computing systems, devices, and components in an environment that in-line secondary transaction can be implemented.

FIG. 15 illustrates an exemplary computing environment 1500 within which in-line secondary transaction systems and methods, as well as the computing, network, and system architectures described herein, can be either fully or partially implemented. Exemplary computing environment 1500 is only one example of a computing system and is not intended to suggest any limitation as to the scope of use or functionality of the architectures. Neither should the computing environment 1500 be interpreted as having any dependency or requirement relating to any one or combination of components illustrated in the exemplary computing environment 1500.

The computer and network architectures in computing environment 1500 can be implemented with numerous other general purpose or special purpose computing system environments or configurations. Examples of well known computing systems, environments, and/or configurations that may be suitable for use include, but are not limited to, personal computers, server computers, client devices, handheld or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 1500 includes a general-purpose computing system in the form of a computing device 1502. The components of computing device 1502 can include, but are not limited to, one or more processors 1504 (e.g., any of microprocessors, controllers, and the like), a system memory 1506, and a system bus 1508 that couples the various system components. The one or more processors 1504 process various computer executable instructions to control the operation of computing device 1502 and to communicate with other electronic and computing devices. The system bus 1508 represents any number of several types of bus structures, including a memory bus or memory controller, a peripheral bus, an accelerated graphics port, and a processor or local bus using any of a variety of bus architectures.

Computing environment 1500 includes a variety of computer readable media which can be any media that is accessible by computing device 1502 and includes both volatile and non-volatile media, removable and non-removable media. The system memory 1506 includes computer readable media in the form of volatile memory, such as random access memory (RAM) 1510, and/or non-volatile memory, such as read only memory (ROM) 1512. A basic input/output system (BIOS) 1514 maintains the basic routines that facilitate information transfer between components within computing device 1502, such as during start-up, and is stored in ROM 1512. RAM 1510 typically contains data and/or program modules that are immediately accessible to and/or presently operated on by one or more of the processors 1504.

Computing device 1502 may include other removable/non-removable, volatile/non-volatile computer storage media. By way of example, a hard disk drive 1516 reads from and writes to a non-removable, non-volatile magnetic media (not shown), a magnetic disk drive 1518 reads from and writes to a removable, non-volatile magnetic disk 1520 (e.g., a "floppy disk"), and an optical disk drive 1522 reads from and/or writes to a removable, non-volatile optical disk 1524 such as a CD-ROM, digital versatile disk (DVD), or any other type of optical media. In this example, the hard disk drive 1516, magnetic disk drive 1518, and optical disk drive 1522 are each connected to the system bus 1508 by one or more data media interfaces 1526. The disk drives and associated computer readable media provide non-volatile storage of computer readable instructions, data structures, program modules, and other data for computing device 1502.

Any number of program modules can be stored on RAM 1510, ROM 1512, hard disk 1516, magnetic disk 1520, and/or optical disk 1524, including by way of example, an operating system 1528, one or more application programs 1530, other program modules 1532, and program data 1534. Each of such operating system 1528, application program(s) 1530, other program modules 1532, program data 1534, or any combination thereof, may include one or more embodiments of the systems and methods described herein.

Computing device 1502 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 1502 via any number of different input devices such as a keyboard 1536 and pointing device 1538 (e.g., a "mouse"). Other input devices 1540 (not shown specifically) may include a microphone, joystick, game pad, controller, satellite dish, serial port, scanner, and/or the like. These and other input devices are connected to the processors 1504 via input/output interfaces 1542 that are coupled to the system bus 1508, but may be connected by other interface and bus structures, such as a parallel port, game port, and/or a universal serial bus (USB).

A display device 1544 (or other type of monitor) can be connected to the system bus 1508 via an interface, such as a video adapter 1546. In addition to the display device 1544, other output peripheral devices can include components such as speakers (not shown) and a printer 1548 which can be connected to computing device 1502 via the input/output interfaces 1542.

Computing device 1502 can operate in a networked environment using logical connections to one or more remote computers, such as remote computing device 1550. By way of example, remote computing device 1550 can be a personal computer, portable computer, a server, a router, a network computer, a peer device or other common network node, and the like. The remote computing device 1550 is illustrated as a portable computer that can include any number and combination of the different components, elements, and features described herein relative to computing device 1502.

Logical connections between computing device 1502 and the remote computing device 1550 are depicted as a local area network (LAN) 1552 and a general wide area network (WAN) 1554. Such networking environments are commonplace in offices, enterprise-wide computer networks, intranets, and the Internet. When implemented in a LAN networking environment, the computing device 1502 is connected to a local network 1552 via a network interface or adapter 1556. When implemented in a WAN networking environment, the computing device 1502 typically includes a modem 1558 or other means for establishing communications over the wide area network 1554. The modem 1558 can be internal or external to computing device 1502, and can be connected to the system bus 1508 via the input/output interfaces 1542 or other appropriate mechanisms. The illustrated network connections are merely exemplary and other means of establishing communication link(s) between the computing devices 1502 and 1550 can be utilized.

In a networked environment, such as that illustrated with computing environment 1500, program modules depicted relative to the computing device 1502, or portions thereof, may be stored in a remote memory storage device. By way of example, remote application programs 1560 are maintained with a memory device of remote computing device 1550. For purposes of illustration, application programs and other executable program components, such as operating system 1528, are illustrated herein as discrete blocks, although it is recognized that such programs and components reside at various times in different storage components of the computing device 1502, and are executed by the one or more processors 1504 of the computing device 1502.

Although embodiments of in-line secondary transaction have been described in language specific to structural features and/or methods, it is to be understood that the subject of the appended claims is not necessarily limited to the specific features or methods described. Rather, the specific features and methods are disclosed as exemplary implementations of in-line secondary transaction.

The invention claimed is:

1. A method, comprising:
   displaying an on-line shopping interface via which an item can be selected for purchase;
   receiving a premium SMS (Short Message Service) billing code from a mobile phone to purchase points that can be applied to purchase the item, the purchase of the points being charged to a phone bill corresponding to the mobile phone;
   determining that a secondary transaction is needed to complete a purchase of the item when a selection to initiate the purchase is received;
   displaying an in-line user interface over a portion of the on-line shopping interface to facilitate the secondary transaction, the in-line user interface being displayed such that the item selected for purchase remains viewable on the on-line shopping interface during the secondary transaction;
   receiving an input to apply the points via the in-line user interface to complete the secondary transaction such that the purchase of the item can be completed via the on-line shopping interface;
   returning a focus of the purchase to the on-line shopping interface;
   updating an account status displayed on the on-line shopping interface when receiving the input via the in-line user interface; and
   completing the purchase of the item via the on-line shopping interface.

2. A method as recited in claim 1, wherein receiving the input includes adding credits to a purchase account via the in-line user interface such that the purchase of the item can be completed with the credits.

3. A method as recited in claim 1, wherein receiving the input includes applying the points to a purchase account via the in-line user interface.

4. A method as recited in claim 1, wherein receiving the input includes receiving billing information associated with a consumer to complete the purchase of the item.

5. A method as recited in claim 1, wherein receiving the input includes receiving secondary transaction information associated with a consumer to complete the purchase of the item.

6. A method as recited in claim 1, further comprising generating a purchase account based on the input via the in-line user interface to complete the secondary transaction.

7. A transaction system, comprising:
   a primary display of an on-line shopping interface via which a selection to initiate a purchase of an item can be received;
   a processor capable of processing computer executable instructions stored on computer readable media configured to implement a transaction application, the transaction application configured to:
   receive a premium SMS (Short Message Service) billing code from a mobile phone to purchase points that can be applied to purchase the item, the purchase of the points being charged to a phone bill corresponding to the mobile phone;
   determine that transaction information is needed to complete the purchase of the item;
   initiate a display of an in-line secondary transaction user interface over a portion of the on-line shopping interface to facilitate obtaining the transaction information while the item selected for purchase remains viewable on the on-line shopping interface display;
   receive the points as part of the transaction information via the in-line secondary transaction user interface such that the purchase of the item can then be completed via the on-line shopping interface;
   return a focus of the purchase to the on-line shopping interface; and
   initiate an update to an account status displayed on the on-line shopping interface when the transaction information is received to facilitate completing the purchase of the item via the on-line shopping interface.

8. A transaction system as recited in claim 7, wherein the transaction application is further configured to receive the transaction information as credits and apply the credits to a purchase account such that the purchase of the item can be completed with the credits.

9. A transaction system as recited in claim 7, wherein the transaction application is further configured to receive the points as the transaction information which can be added to a purchase account.

10. A transaction system as recited in claim 7, wherein the transaction application is further configured to receive the transaction information as billing information to complete the purchase of the item.

11. A transaction system as recited in claim 7, wherein the transaction application is further configured to receive the transaction information as consumer associated purchase information to complete the purchase of the item.

12. A transaction system as recited in claim 7, wherein the account status is updated when the transaction information is received via the in-line secondary transaction user interface.

13. A transaction system as recited in claim 7, wherein the transaction application is further configured to generate a purchase account based on the transaction information received via the in-line secondary transaction user interface.

* * * * *